May 5, 1931.   L. MICHA   1,804,058
SCREW NUT
Filed Sept. 16, 1930
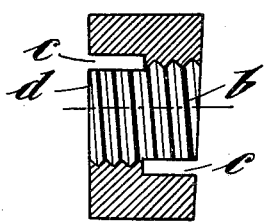
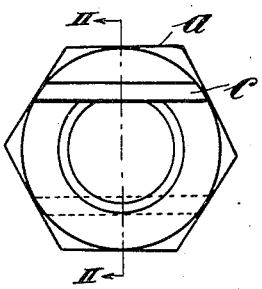
Inventor.
Léon Micha
per: J. Gevers
Attorney.

Patented May 5, 1931

1,804,058

UNITED STATES PATENT OFFICE

LÉON MICHA, OF ANTWERP, BELGIUM

SCREW NUT

Application filed September 16, 1930, Serial No. 482,288, and in Belgium September 25, 1929.

The present invention has for its object an improved screw-nut, which can also be used as a lock-nut. Said nut is characterized by the combination of a bearing surface inclined with respect to the axis of the thread, two recesses being provided the one on the base, the other on the opposite face, said recesses being situated in the respective areas where the oblique effort is transmitted when tightly screwing down the nut. Said recesses may be in the form of slots substantially tangent to the thread and which are cut on either side of the nut, the one in the base up to a certain height, the other on the outer face up to a certain depth. Said slots will remove part of the thread of the nut and leave each a free space between the bolt and the nut, so as to allow an inclination of the nut with relation to the bolt when the nut is tightly screwed down.

It is a fact that nuts which obliquely press on the bolt, as it is the case for nuts having an inclined bearing face, act only as check nuts when the bolt is bent over, this being of considerable inconvenience. Reversely, the nut forming the object of the present invention may be tightly screwed down without bending the bolt, owing to the two recesses or slots which allow a slight flexion of the nut. The slots, indeed, open the nut in two places where the effort of screwing down the nut is obliquely reported, and namely at the lower side of the base and on the opposite side of the outer face. This flexion of the nut makes the sharp edges of the thread penetrate into the thread of the bolt and the resiliency of said sharp edges increases the adherence of the nut to the bolt. The nut being, however, closed on the upper face on one side and on the base at the opposite side, can only have a flexion within determined limits.

The invention will be described hereafter with reference to the accompanying drawings, in which has been shown, by way of example, a screw-nut made in conformity with the invention.

Fig. 1 is a plan view of the nut;
Fig. 2 is a section on line II—II of Fig. 1.

As illustrated in the drawings, the nut $a$ has at least one face $b$ inclined relatively to the axis of the thread, said face being the bearing face. The outer face $d$ may be parallel to the face $b$ or at right angles to said axis. The nut is provided with two slots $c$ substantially tangent to the thread and cut the one in the bearing face $b$ up to a certain height, the other in the side face $d$ up to a certain depth. When the nut $a$ is slightly screwed down by means of an ordinary wrench, the contact between the face $b$ and the bearing will produce the effect of serrating the thread of the nut on the thread of the bolt, in a direction forming an angle with the direction of the bolt axis, and the recesses $c$ allow the nut to lift on one side and incline on the other side, the sharp, more or less resilient edges of the thread forcibly penetrating into the thread of the bolt, which, in this way, will be energically pressed.

Instead of providing in the faces of the nut two slots substantially tangent to the thread as described herebefore, it would be possible to cut in the opposite faces of the nut recesses extending from the periphery to the center one in the base up to a certain height, the other in the outer face up to a certain depth, or it would also be possible to cut radial slots in the nut, from the periphery to the center, said radial cuts extending to a certain extent and situated opposite to each other. It seems, however, that the form of embodiment originally described with reference to the drawing is the most advantageous and practical.

I claim:

1. A screw-nut having in combination a bearing surface inclined with respect to the axis of the thread and recesses on both the base and opposite face, said recesses being situated in the respective areas where the oblique effort is transmitted when tightly screwing down the nut.

2. A screw-nut having in combination a bearing surface inclined with respect to the axis of the thread and a slot cut in both the base and opposite face, said slots being substantially tangent to the thread and extending to an appreciable depth opposite to each other.

3. A screw-nut having in combination a bearing surface inclined with respect to the axis of the thread and a slot cut in the base opposite the elevated point of same, and a slot cut in the opposite face of the nut, both slots being parallel to each other and substantially tangent to the thread of the nut.

In testimony whereof I have signed hereunto my name.

L. MICHA.